(12) United States Patent
Holden

(10) Patent No.: US 7,722,004 B2
(45) Date of Patent: May 25, 2010

(54) SCOOTER HOLDING DEVICE

(76) Inventor: Mitchell V. Holden, 16141 Heatherwood Ct., Strongsville, OH (US) 44149

( * ) Notice: Subject to any disclaimer, the term of this patent is extended or adjusted under 35 U.S.C. 154(b) by 22 days.

(21) Appl. No.: 12/115,007

(22) Filed: May 5, 2008

(65) Prior Publication Data

US 2008/0302940 A1     Dec. 11, 2008

Related U.S. Application Data

(60) Provisional application No. 60/942,815, filed on Jun. 8, 2007.

(51) Int. Cl.
     *A47B 91/00*      (2006.01)
(52) U.S. Cl. .................. 248/346.01; 211/22; 211/194
(58) Field of Classification Search ............ 248/346.01, 248/346.03; 211/17, 22, 24, 194; 188/32; 254/88; 16/42 R; 108/53.1
See application file for complete search history.

(56) References Cited

U.S. PATENT DOCUMENTS

| | | | | |
|---|---|---|---|---|
| 446,835 A | * | 2/1891 | Kennedy | ............ 211/20 |
| 2,183,410 A | * | 12/1939 | Scriven | ............ 108/140 |
| 2,717,084 A | * | 9/1955 | Groenendal | ............ 211/20 |
| 3,228,358 A | * | 1/1966 | Sepe et al. | ............ 108/53.3 |
| D260,248 S | * | 8/1981 | Gallagher | ............ D12/115 |
| 6,006,675 A | * | 12/1999 | Heil | ............ 108/55.3 |
| 6,364,269 B1 | * | 4/2002 | Hofer | ............ 248/346.01 |
| 6,524,040 B1 | * | 2/2003 | Heil | ............ 410/67 |
| D479,818 S | * | 9/2003 | Gladden, III | ............ D12/115 |
| 6,805,609 B1 | * | 10/2004 | Paukert et al. | ............ 446/429 |
| 6,814,529 B2 | * | 11/2004 | Junge | ............ 410/46 |
| 6,857,533 B1 | * | 2/2005 | Jackson | ............ 220/4.01 |
| 7,273,197 B1 | * | 9/2007 | Huggins et al. | ............ 248/154 |

OTHER PUBLICATIONS http://www.razrrak.com/index.html.
http://www.scooterport.com/.

* cited by examiner

*Primary Examiner*—Korie Chan
(74) *Attorney, Agent, or Firm*—Fay Sharpe LLP

(57) ABSTRACT

A scooter holding device and method of manufacturing a scooter holding device is disclosed. The scooter holding device has a top end having a first end and a second end, a wheel holding recess positioned at the first end a second wheel holding recess that is transverse to the first wheel holding recess at a second end. The scooter holding device is used to hold and store a scooter when the scooter is not in use.

20 Claims, 3 Drawing Sheets

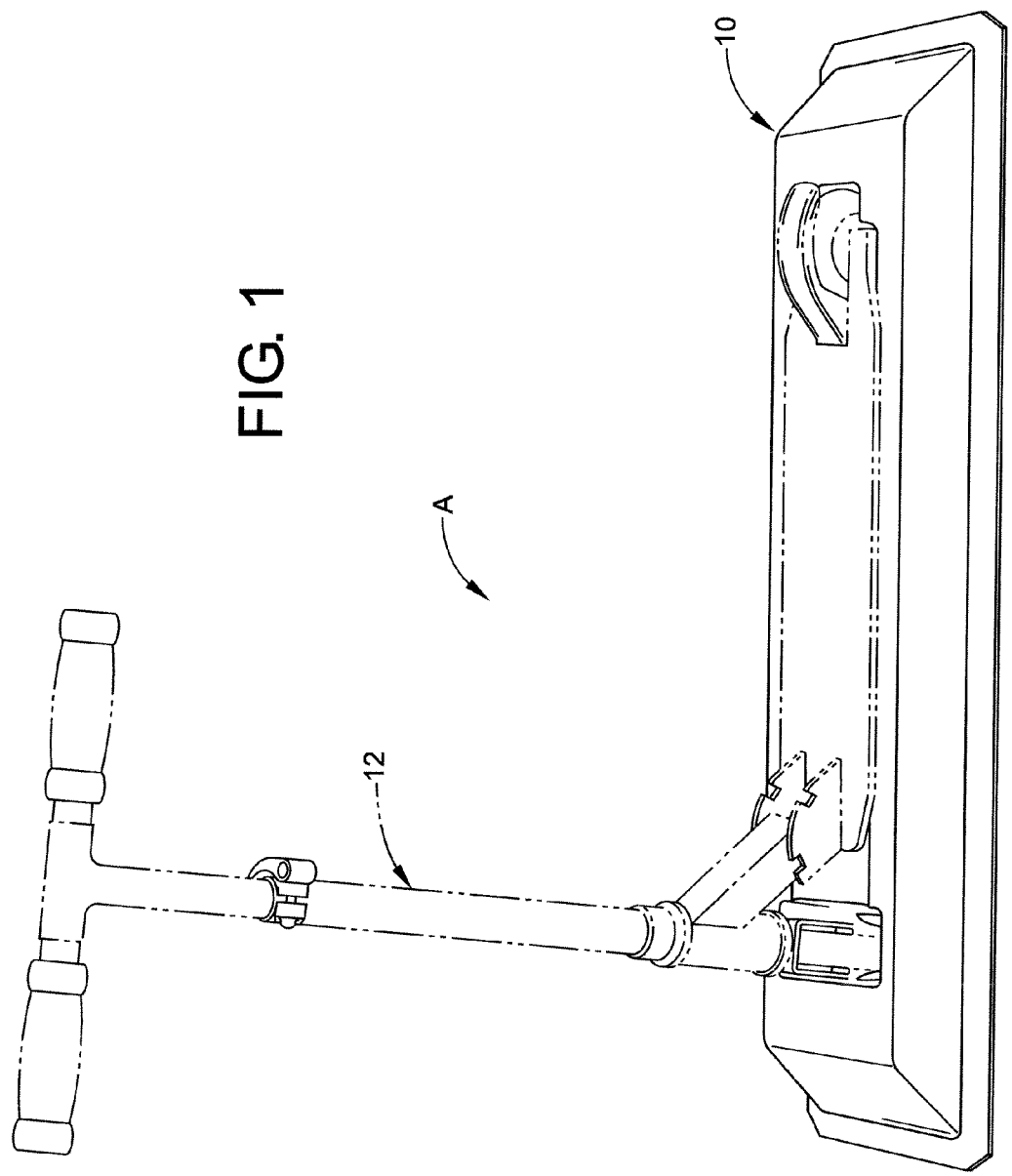

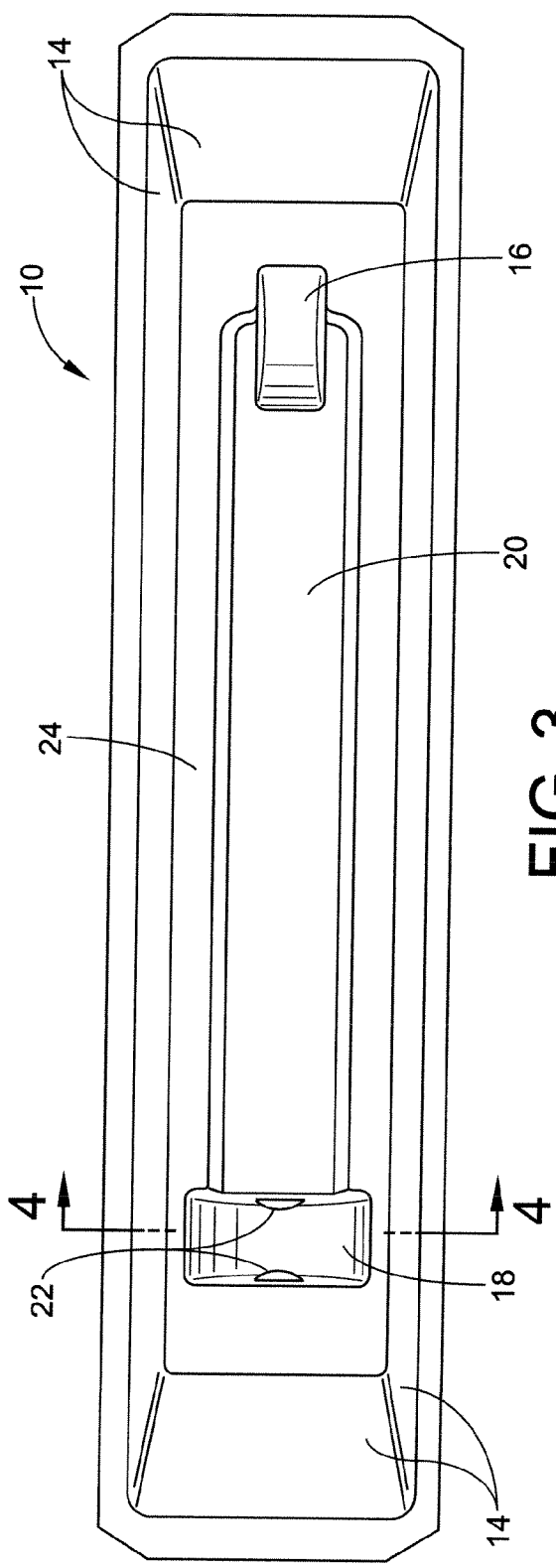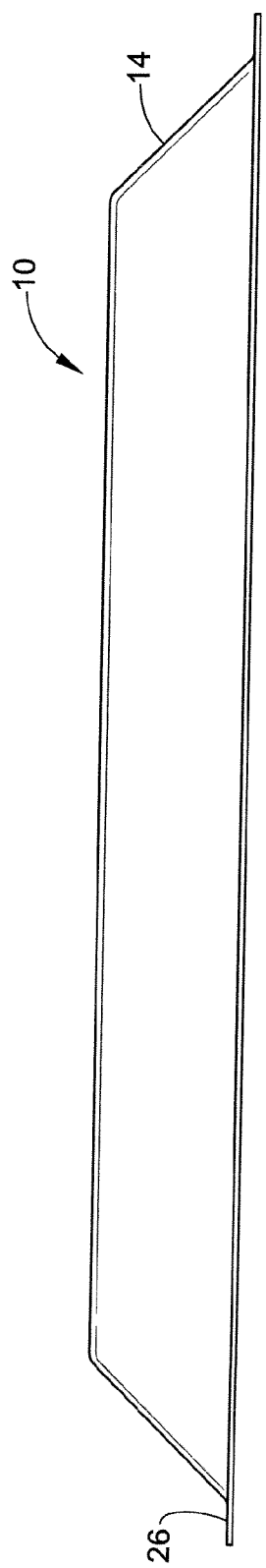
FIG. 3
FIG. 2

SCOOTER HOLDING DEVICE

This applications claims priority to and the benefit of U.S. Application Ser. No. 60/942,815, filed Jun. 8, 2007, the disclosure of which is hereby incorporated herein by reference.

BACKGROUND

This disclosure relates to a consumer product for storing a scooter and a method of making the consumer product.

While this disclosure is particularly directed towards a consumer product used to store a RAZOR® scooter and will thus be described with specific reference thereto, it will be appreciated that the disclosure may have usefulness in other fields and applications. For example, this disclosure may be used with the storage of other two-wheeled vehicles, such as electric scooters, XOOTR® brand scooters and other kick scooters.

By way of background, recently there has been an increase in the use of two-wheeled scooter type vehicles. One of the more common forms of these vehicles are the kick scooter, which is a non-motorized foot powered scooter. Riders, usually children, are able to use these scooters in order to cover short distances. Users also may use this type of scooter for recreation or exercise purposes.

When the scooter is not in use there are a few problems with storage. Many of these types of scooters may be folded in half where the handle bar is on a hinge as to where it collapses onto the body portion of the scooter. However, oftentimes, users do not want to take the time to properly place the scooter in this position. Therefore, scooters are often left on the ground or left leaning against automobiles, doors, and/or walls. When scooters are left in this position they are, at times, vulnerable to damage. Also, when scooters are not left sitting upright they may damage the surfaces they are leaning on, such as doors and automobiles. Furthermore, when the scooters are lying down, not folded or not otherwise put away properly, there are instances where a driver of an automobile may not see them. When this happens, the scooter may be run over. This may cause damage to the scooter and/or the automobile.

Attempts in the industry to solve this problem include providing the scooters with kickstands. Moreover, when kickstands get a lot of use the holders commonly wear causing the kickstand to fall out of place when riding. This causes kickstands to often interfere with the riding of the scooter. Furthermore, kickstands can be difficult or expensive to install onto a scooter.

So there is a need in the industry for a scooter stand that is inexpensive to purchase and easy to use. Furthermore, there is a need in the industry for a scooter stand that is inexpensive to manufacture. The present disclosure contemplates a new method and apparatus that resolves the above-reference difficulties and others.

SUMMARY OF THE DISCLOSURE

The apparatus and the method of making the apparatus is provided. This disclosure will allow for a scooter stand that is inexpensive to manufacture and hold a scooter upright. Furthermore, the scooter stand places the scooter in a compact position, making the handle bars parallel with the scooter body.

In one aspect of the disclosure the apparatus includes a scooter holding device comprising a top face having a first end and a second end, a wheel holding recess positioned at the first end and a second wheel holding recess that is transverse to the first wheel holding recess at the second end.

In accordance with another aspect of the present disclosure, the scooter holding device includes a support base having a plurality of sidewalls.

In accordance with another aspect of the present disclosure, the scooter holding device has a support base that forms an area that is relatively larger than the top face.

In accordance with another aspect of the present disclosure, the scooter holding device includes sidewalls that have a tip that increases the ground contact surface area.

In accordance with another aspect of the present disclosure, the scooter holding device has at least one sidewall that forms a substantially 90° angle with the top face, which enables wall mounting.

In accordance with another aspect of the present disclosure, the scooter holding device includes a body holding portion that spans between the first wheel holding recess and the second wheel holding recess.

In accordance with another aspect of the present disclosure, the scooter holding device includes a notch positioned at the first wheel holding recess which is used in order to stabilize an associated scooter.

According to another aspect of the present disclosure, the apparatus includes a scooter stand device comprising a base having a top face, including a front end, a back end and a plurality of sidewalls, a front wheel holding recess, positioned adjacent to the front end in the top face, a rear wheel holding recess positioned adjacent to the back end in the top face, and a body holding recess positioned between the front wheel holding recess and the rear wheel holding recess.

In accordance with another aspect of the present disclosure, the scooter stand device includes a plurality of sidewalls, including a footing that increases ground contact surface area.

In accordance with another aspect of the present disclosure, the scooter stand is made from a continuous piece of material.

In accordance with another aspect of the present disclosure, the scooter stand device is shaped via injection molding.

In accordance with another aspect of the present disclosure, the scooter stand is shaped via blow molding.

In one aspect of the disclosure, the method of constructing the scooter stand includes heating a sheet of material to a forming temperature, positioning the sheet of material on a mold having two ends in order that the sheet of material takes the form of the mold. The mold includes a first wheel holding recess positioned at the first end, a second wheel holding recess that is traverse to the first wheel holding recess positioned at the second end cooling the sheet of material and removing the sheet of material from the mold.

In accordance with another aspect of the present disclosure, the method includes using material that is plastic.

BRIEF DESCRIPTION OF THE DRAWINGS

The presently described embodiments exist in the construction, arrangement and combination of various parts of the device and steps of the method whereby the objects contemplated are attained as hereinafter more fully set forth specifically pointed out in the claims and illustrated in the accompanying drawings in which:

FIG. 1 illustrates the scooter holding device and an associated scooter.

FIG. 2 is a perspective view of a scooter holder assembly.

FIG. 3 is a top plain view of the scooter hold assembly.

DETAILED DESCRIPTION

Figure 4:
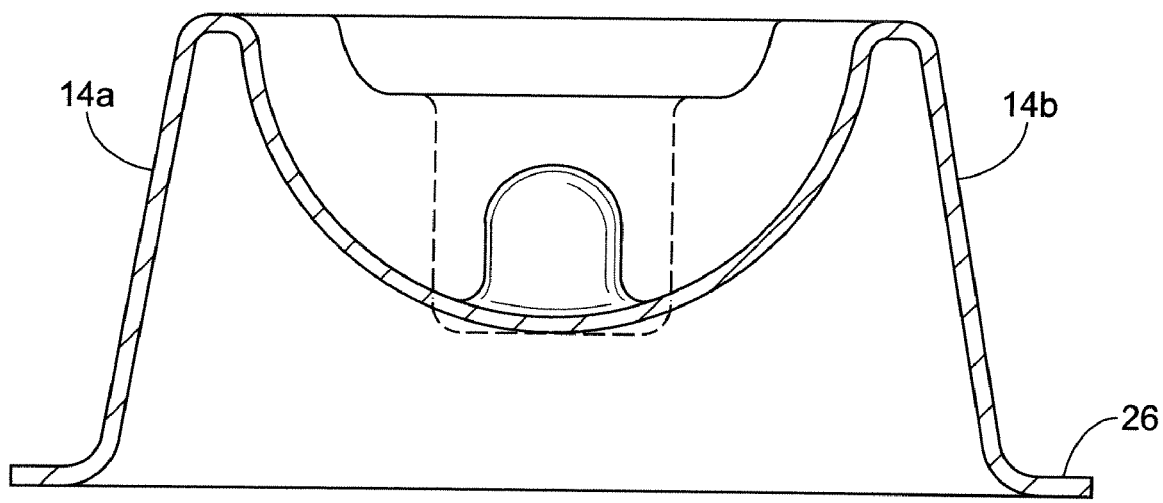
FIG. 4 is a cross-sectional view of the scooter holder assembly.

Referring now to the drawings where the showings are for the purposes of illustrating the disclosed embodiment only, and not for the purposes of limiting the same. FIG. 1 provides a plain view of the scooter holder assembly with an associated scooter. This view shows how the scooter holder device may be used. The associated scooter 12 is shown inside the scooter holder 10. It should be understood that this represents but one embodiment of the scooter holder device and the present disclosure may be incorporated in a variety of different manners.

In operation, as described in greater detail below, the presently described embodiments include an apparatus used for holding and/or storing an associated scooter and a method of manufacturing the device. This device allows for simple storage and removal of an associated scooter.

Still referring to FIG. 1, the scooter holding device is generally used to hold the scooter in the pictured position. As shown, the front wheel of the scooter 12 is transverse to the scooter body and the rear wheel. In this form, the handle of the scooter is parallel with the body, minimizing the amount of space that the scooter takes up.

Now referring to FIG. 2, which is a perspective view of the scooter holding device 10. The scooter holding device includes sidewalls 14. The sidewalls 14 expand out from the top portion 24 of the scooter holding device creating a larger area at the bottom than the top. The scooter stand device 10 also has a tip or footing 26 at the bottom end of the sidewalls 14. This is useful in creating stability for the scooter holding device. In this form, the scooter 12 is less likely to fall when placed in the device 10. This may also aid in stacking the device for shipment and shelving. This kind of design allows for one scooter holding device 10 to fit directly on top of another, thereby minimizing the amount of space used for packaging or storing a plurality of scooter holding devices 10. This design also makes it easy to count and separate the scooter holding devices 10 once they have been stacked.

Now referring to FIG. 3, which is a top view of the scooter holding device 10. This top view shows a front tire recess 18, a rear tire recess 16, a body holding portion 20 and a top face 24. This view also shows the top face 24 being surrounded by a plurality of sidewalls 14. Furthermore, this design shows a notch 22 which may be used to grasp the front wheel of the scooter 12 in order to prevent the scooter from falling out of the scooter holding device 10.

As shown in FIG. 1, the scooter may be placed in its respective recesses during storage. In this respect, the front wheel holding recess 18 would be configured to receive the front wheel of the associated scooter 12. In a similar manner, the rear wheel holding recess 16 would be configured to receive the rear wheel of the associated scooter 12. Also, the body holding recess 20 would be configured to receive the body of the associated scooter.

The size of the various recesses may vary according to the associated scooter 12 that the scooter holding device 10 is configured to hold. For example, if a consumer purchases a scooter holding device 10 that is configured to store scooter brand "A", then it may have dimensions specifically designed to hold scooter brand "A". Although it should be appreciated that many scooters are similar sizes and some scooter holding device 10 classes may fit many brands. This may be the case even if the scooter holding device 10 is manufactured specifically to fit a particular brand of scooter.

In this embodiment, a notch 22 is positioned in the front wheel holding recess 18. This notch 22 may be used in order to secure the associated scooter 12 in place. In this form, the scooter 12 would not come out without a force being applied to the top face 24 of the scooter holding device 10. For example, if a person tried to pick up the scooter while it is in the scooter holding device 10, the scooter 12 holding device 10 would stay attached to the scooter 12. However, if a user were to place a foot on the top face 24 of the scooter holding device 10, while pushing the scooter 12 up, the force would overcome the grip of the notch 22, thereby effectively removing the scooter from the scooter holding device 10.

Now referring to FIG. 4 which shows a cutaway view of the scooter holding device 10. In this view, the sidewalls 14a and 14b, the footing 26, and the body holding recess 20 are shown. The outline shows the cutaway portion of the scooter holding device 10.

Sidewall 14a may be at a substantially 90° or less angle relative to the top face 24. This design enables easier stacking for storage of the scooter holding device 10. Sidewall 14b is positioned to allow a relatively larger base area than top face 24. This aids stability of the scooter holding device 10.

A footing 26 is also connected to the sidewall 14 in order to aid in the stability of the scooter holding device. This creates a larger surface area that is in contact with the ground. This footing 26 aids in holding the scooter holding device 10 in place.

FIG. 4 also shows that this may be one continuous piece of material. In this sense, the scooter holding device 10 may also be formed via an injection molding or blow molding manufacture. More specifically, this device 10 may be formed by heating material, i.e., plastic, to a forming temperature. A forming temperature will vary depending on the type of material used. However, it should be appreciated that the forming temperature would be any temperature that would allow the piece of material to form the shape of the mold that it is placed on.

The method may continue in the form of injection molding with feeding the material into an injection molding machine in the form of a continuous strip. The material may then be worked and warmed by an auger screw in a barrel that has a heated temperature controlling mechanism. This will keep the material in a liquid or near liquid form. As the material accumulates towards the front of the screw, the screw may then be allowed to be pushed back so that the material may be injected as the screw is pushed forward under hydraulic pressure. The material is then injected into the mold and takes the shape of the mold. In this instance the mold would be in the inverse shape of the scooter holding device 10.

The device may also be formed through blow molding. In this instance, the material may be melted and extruded into a hollow tube. The material may then be captured by closing the hollow tube into a cooled metal mold. Again, the metal mold would be the inverse shape of the scooter stand. The method would continue with blowing air into the material, inflating it into the shape of the mold. The material would then be cooled and ejected from the mold.

The mold would include a first wheel holding recess positioned at a first end, a second wheel holding recess that is traverse to the first wheel holding recess at a second end. The method would continue with cooling the sheet of material and removing the sheet of material from the mold. In this form, the sheet of material would generally take the shape of the mold and the resultant assembly would be a scooter stand device 10.

This device may be formed through a variety of methods including, but not limited to, vacuum molding, injection molding and/or blow molding. Any of these methods are acceptable under this disclosure.

The above description merely provides the disclosure of particular embodiments that is not intended for the purpose of limiting the same thereto. As such, disclosure is not limited to only the above described embodiments, rather it is recognized that one skilled in the art could conceive alternative embodiments that fall within the scope of the invention.

The invention claimed is:

1. A holding device for an associated scooter, the associated scooter including a platform, a front wheel and a rear wheel respectively connected to two ends of the platform, and a handlebar assembly having a grip portion operationally connected to the front wheel for turning the front wheel, the holding device comprising:
   a top face configured to receive the platform of the associated scooter and having a first end and a second end;
   a first wheel holding recess positioned at said first end for receiving the front wheel of the associated scooter; and
   a generally crescent shaped second wheel holding recess that is transverse to said first wheel holding recess at said second end for receiving the rear wheel of the associated scooter,
   wherein the holding device securely holds the scooter in an upright position and the transverse arrangement of said first and second wheel holding recesses positions the grip portion of the handlebar assembly of the associated scooter alone a longitudinal extent of said top face.

2. The scooter holding device according to claim 1 further comprising a support base having a plurality of sidewalls.

3. The scooter holding device according to claim 2 wherein said support base forms an area that is relatively wider than said top face.

4. The scooter holding device according to claim 2 wherein said plurality of sidewalls include tips that increase ground contact surface area.

5. The scooter holding device according to claim 4 wherein said tips form a footing configured to aid in stackability and separation when stacked together.

6. The scooter holding device according to claim 1 further comprising a body holding recess located in said top face and spanning between said first wheel holding recess and said second wheel holding recess, said body holding recess dimensioned to receive the platform of the associated scooter such that a top surface of the platform is generally flush with said top face.

7. The scooter holding device according to claim 1, further comprising a notch adjacent to said first wheel holding recess.

8. A stand device for an associated scooter, the associated scooter including a platform, a front wheel and a rear wheel respectively connected to two ends of the platform, and a handlebar assembly having a grip portion operationally connected to the front wheel for turning the front wheel, the stand device comprising:
   a base having a top face having a front end and a back end, and plurality of sidewalls;
   a front wheel holding recess positioned adjacent to the front end in said top face end for receiving the front wheel of the associated scooter;
   a rear wheel holding recess positioned adjacent to the back end in said top face end for receiving the rear wheel of the associated scooter, said rear wheel holding recess being transverse to said front wheel holding recess, at least one of the front and rear wheel holding recesses having a curved shape; and
   a body holding recess positioned between said front wheel holding recess and said rear wheel holding recess end for receiving the platform of the associated scooter, said body holding recess being dimensioned slightly greater than the platform for retaining the associated scooter in said stand device in an upright position.

9. The scooter stand device according to claim 8, further comprising a notch adjacent to said front wheel holding recess configure to secure an associated scooter.

10. The scooter stand device according to claim 8 wherein said plurality of sidewalls include a footing that increases ground contact surface area.

11. The scooter stand device according to claim 8 wherein said scooter stand device is made from a continuous piece of material.

12. The scooter stand device according to claim 8 wherein said scooter stand device is shaped via injection molding.

13. The scooter stand device according to claim 8 wherein said scooter stand device is shaped via blow molding.

14. A stand device for an associated scooter, the associated scooter including a platform, a front wheel and a rear wheel respectively connected to two ends of the platform, and a handlebar assembly having a grip portion operationally connected to the front wheel for turning the front wheel, the stand device comprising:
   a unitary base including:
      a top surface,
      a front wheel holding recess located in said top surface for receiving the front wheel of the associated scooter, and
      a rear wheel holding recess located in said top surface for receiving the rear wheel of the associated scooter, said rear wheel holding recess being transverse to said front wheel holding recess and having a width less than a width of said front wheel holding recess,
      a body holding recess located in said top surface and extending between said front and rear wheel holding recesses for receiving the platform of the associated scooter, said rear wheel holding recess extending at least partially within said body holding recess such that said body holding recess at least partially defines said rear wheel holding recess, a depth of each wheel holding recess being greater than a depth of said body holding recess.

15. The scooter stand device according to claim 14 wherein said front wheel holding recess is at least partially defined by first and second side walls and a curved bottom wall, at least one of the side walls includes a projection engaging the front wheel of the associated scooter.

16. The scooter stand device according to claim 14 wherein the transverse arrangement of said first and second wheel holding recesses positions the grip portion of the handlebar assembly of the associated scooter along a longitudinal extent of said top face wherein the associated scooter is retained within an outer perimeter of said base.

17. A holding device for an associated scooter, the associated scooter including a platform, a front wheel and a rear wheel respectively connected to two ends of the platform, and a handlebar assembly having a grip portion operationally connected to the front wheel for turning the front wheel, the holding device comprising:
   a base including a top surface having a first end and a second end;
   a first wheel holding recess positioned at said first end for receiving the front wheel of the associated scooter;
   a second wheel holding recess that is transverse to said first wheel holding recess at said second end for receiving the rear wheel of the associated scooter, said second wheel holding recess having a depth approximately equal to a radius of the rear wheel; and a body holding recess spanning between said first wheel holding recess and said second wheel holding recess for receiving the platform of the associated scooter, said body holding recess having a depth approximately equal to a depth of the platform wherein a top surface of the platform is generally flush with said top surface of said base.

18. The scooter stand device according to claim 17 wherein each of said first and second wheel holding recesses is at least partially defined by a curved wall having an end that terminates at said top face.

19. A holding device for an associated scooter, the associated scooter including a platform, a front wheel and a rear wheel respectively connected to two ends of the platform, and a handlebar assembly having a grip portion operationally connected to the front wheel for turning the front wheel, the holding device comprising:

a base including a top surface having a first end and a second end;

a first wheel holding recess formed in said top surface and positioned at said first end for receiving the front wheel of the associated scooter, said first wheel holding recess being at least partially defined by a curved bottom wall, said first wheel holding recess having a width larger than a width of the front wheel thereby allowing the front wheel to be slightly canted within the first wheel holding recess;

a second wheel holding recess that is transverse to said first wheel holding recess at said second end for receiving the rear wheel of the associated scooter, said second wheel holding recess being at least partially defined by a curved bottom wall, said second wheel holding recess having a width approximately equal to a width of the rear wheel; and a body holding recess spanning between said first wheel holding recess and said second wheel holding recess for receiving the platform of the associated scooter, said body holding recess having a width and depth approximately equal to a width and depth of the platform.

20. The holding device according to claim 19 wherein said base further includes a projection extending into said first wheel holding recess for engaging the front wheel of the associated scooter.

* * * * *